Dec. 6, 1966   C. V. BELANGER   3,289,286
O-RING SEATING TOOL
Filed Jan. 30, 1964
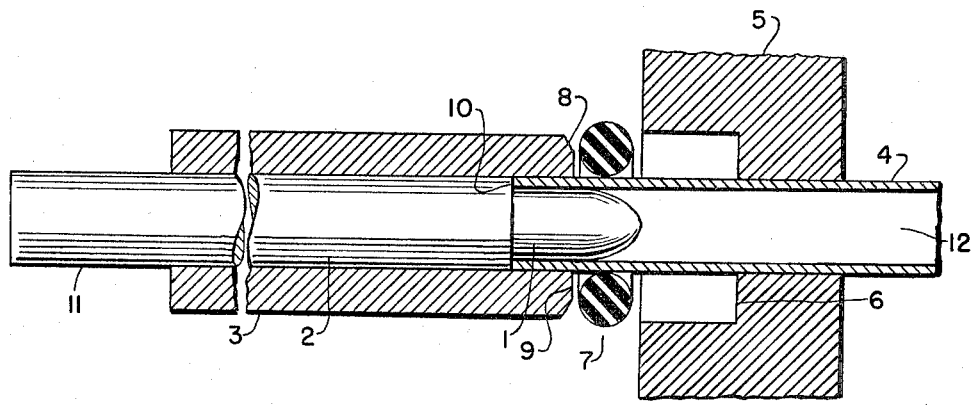
FIG. I
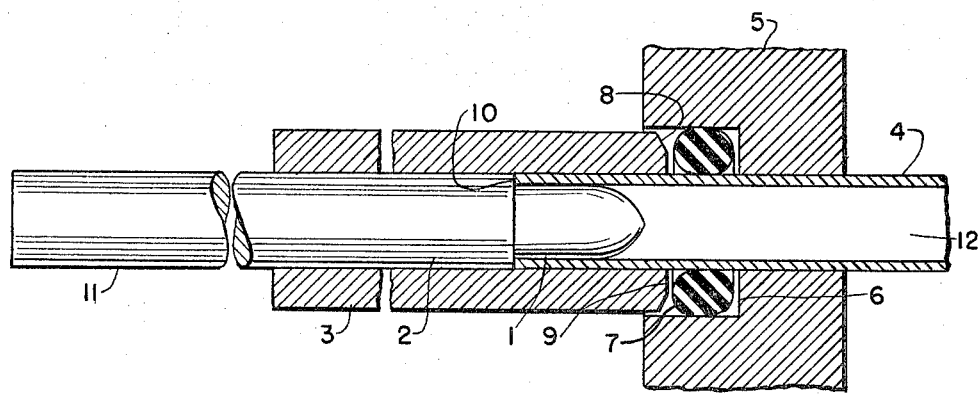
FIG. II
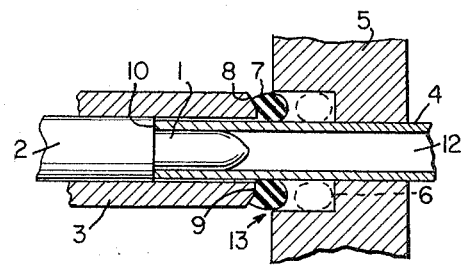
FIG. III
INVENTOR.
Celestin Victor Belanger
BY

United States Patent Office 3,289,286
Patented Dec. 6, 1966

3,289,286
O-RING SEATING TOOL
Celestin Victor Belanger, Beaumont, Tex., assignor to
Henry W. Allen, Beaumont, Tex., trustee
Filed Jan. 30, 1964, Ser. No. 341,356
3 Claims. (Cl. 29—235)

My invention relates to an "O-ring seating tool" for inserting O-rings, particularly elastic or extremely viscous fluid and/or resilient types, in an O-ring cavity formed as an annulus by a counterbore in a dimensionally stable element and the outside surface of a tube protruding therethrough.

The primary object of my invention is to provide a tool that can be inserted into a tube hole to align it parallel to the longitudinal axis of the tube so that a closely fitting cylinder element in combination therewith can sleeve over it onto the outside surface of the tube also in a very close tolerance and contact an O-ring element that has previously been installed around the proruding end of the tube and roll the said O-ring element into an O-ring cavity existing as an annulus formed by a counterbore in a dimensionally stable element and a tube protruding therethrough without pinching or cutting the O-ring when force is applied by hand upon the sleeve in the direction of the O-ring cavity.

The extremely viscous fluid or elastic O-ring element of which I speak is used to form a pressure seal and many are very small in the cross sectional dimensions of .07 of an inch. They must be compressed slightly into an O-ring cavity to form an obturating effect between two dimensionally stable elements. It is very time consuming, difficult, and undependable to compress them with the fingers in an O-ring cavity of the type described above where there are as many as 1500 of them at each end of one known use in a tubular heat exchanger bundle. This tool will insert and seat 10 or more a minute and will produce a positive uniform seating action upon the O-ring in the O-ring cavity to effect a positive leak-proof seal. Two a minute can be inserted with the fingers, but it is impossible to seat them uniformly in the O-ring cavity. Also, the elastomer or extremely viscous fluid or elastic type O-ring elements are fragile and are easily pinched and cut when being compressed into the O-ring cavities. This tool is so designed to positively prevent this pinching and cutting action which occurs at the lip of the O-ring cavity when a sleeve cut square or of improper design on the end is used to tamp the O-ring element into the O-ring cavity of the type described above. A cut O-ring will not form a fluid pressure seal. I have found that a sleeve with a bevel of approximately 30 degrees from the longitudinal external surface of the sleeve will produce a lifting action on the O-ring element from the tube surface and at the same time allow the elastic or extremely viscous fluid O-ring element to distort and roll upon the surface of the bevel when it contacts the lip of the O-ring cavity and be rolled into the O-ring cavity before any pinching action can occur between the largest peripheral portion of the sleeve and the lip of the O-ring cavity.

FIGURE I is a sectional view showing the O-ring seating tool aligned with a tube prior to seating the O-ring element in the O-ring cavity.

FIGURE II is a sectional view showing the O-ring seating tool aligned with a tube after the O-ring element has been seated in the O-ring cavity.

Referring to FIG. I, the tube hole pilot head 1 is adapted to extend and fit on the inside of the tube 4 in a very close tolerance and is provided with a taper at the end that reduces to a diameter somewhat less than the inside diameter of the tube 4 for inserting it fast and easily into the tube hole 12. This tube hole pilot head 1 is attached axially to the sleeve guide rod 2 which has substantially the same outside diameter as the outside diameter of the tube 4 and is provided with the shoulder stop 10 that abuts the end of the tube 4. The sleeve 3 is adapted to slide over the sleeve guide rod 2 with a very close tolerance but is shorter than the said sleeve guide rod 2 whereby the hand can hold the said guide rod 2 at point 11 while the sleeve 3 is moved back and forth to contact the O-ring element 7 as it exists around the tube 4 outside of the O-ring cavity 6. The sleeve 3 is provided with a bevel 8, preferably 30 degrees from the longitudinal external surface of the sleeve 3. The bevel 8 can but does not extend to the inside periphery of the sleeve 3 but as shown a portion of the end of the sleeve 3 is left as face 9. In this manner the elastic O-ring 7 is caused to roll slightly and lift from the surface of the tube 4 when the face 9 starts to distort it as the sleeve 3, which has a slightly less outside diameter than the inside diameter of the cavity 6, is forced to slide over the tube 4 into the O-ring cavity 6. The bevel 8 extends far enough back on the outer periphery of the sleeve 3 to allow the elastomer or extremely viscous fluid O-ring 7 to lay back, flow or roll slightly onto this bevel 8 so that the entire O-ring 7 is forced into the O-ring cavity 6 without any pinching action upon the O-ring 7 between the lip of the O-ring cavity 6 and the sleeve 3 as the sleeve 3 enters the O-ring cavity 6 behind the O-ring 7.

As shown in FIG. 3, it is of extreme importance that the surface of the bevel 8 be of sufficient area and angle to give relief and displacement to the lifting action and distortion of the O-ring 7 in a rearward direction so as to in effect reduce its radial extent for clearance of the lip of the O-ring cavity 6 as indicated by the reference numeral 13 in this figure. This action serves to prevent any pinching action on the O-ring 7 between the lip of the O-ring cavity 6 and top of the bevel 8 when the sleeve 3 enters the cavity 6 behind the O-ring 7 to thereby seat it uniformly and properly in the O-ring cavity 6.

It is obvious that minor changes in details of construction can be made without departing from the spirit of my invention.

Having fully described the parts of my invention and its mode of operation, I claim:

1. A tool for seating an O-ring in a compressed condition between a hollow member and a cavity of a retaining member, said cavity being formed about the end of said hollow member which is to be sealed with respect to said retaining member comprising a guide rod having a pilot means at the forward end for insertion into said hollow member, a sleeve slideably and coaxially disposed around said guide rod and movable in a longitudinal direction between a first position and a second position, the forward end of said sleeve being adapted to engage said O-ring during forward movement from said first position to said second position to push said O-ring to a seated position in said cavity, the outer diameter of said forward end of said sleeve being less than the diameter of said cavity and the inner diameter of said sleeve being greater than the outer diameter of said hollow member so that said forward end of said sleeve may surround said end of said hollow member and lie within said cavity when said O-ring has been moved to said seated position, and a rearwardly extending beveled face around the outer periphery of said forward end of said sleeve for distorting said O-ring to prevent pinching of said O-ring between said forward end of said sleeve and the lip of said cavity during the seating operation.

2. The combination of claim 1 wherein said forward end of said sleeve has a second face formed at an angle to said beveled face and perpendicular to the longitudinal axis of said sleeve.

3. The combination of claim 2 wherein said pilot means at the forward end of said guide rod comprises a head member peripherally reduced in diameter by approximately the thickness of the walls of said hollow member and a stop on said guide rod adapted to abut said end of said hollow member during the seating operation.

References Cited by the Examiner

UNITED STATES PATENTS

| | | | |
|---|---|---|---|
| 473,008 | 4/1892 | Lynch | 81—8.1 |
| 705,564 | 7/1902 | Dorman | 29—235 X |
| 2,177,231 | 10/1939 | Tinnerman | 29—229 X |
| 3,149,413 | 9/1964 | Baskell | 29—235 |

FOREIGN PATENTS 4,500  10/1908  Great Britain.

WILLIAM FELDMAN, *Primary Examiner.*

J. C. Peters, *Assistant Examiner.*